(12) United States Patent
Agerstam et al.

(10) Patent No.: US 10,148,514 B2
(45) Date of Patent: Dec. 4, 2018

(54) DEVICE DISCOVERY USING DISCOVERY NODES

(71) Applicant: Intel Corporation, Santa Clara, CA (US)

(72) Inventors: Mats Agerstam, Portland, OR (US); Robert A. Colby, Granite Bay, CA (US); Jaideep Moses, Portland, OR (US); Patrick C. Lankswert, Prospect, KY (US)

(73) Assignee: Intel Corporation, Santa Clara, CA (US)

( * ) Notice: Subject to any disclaimer, the term of this patent is extended or adjusted under 35 U.S.C. 154(b) by 686 days.

(21) Appl. No.: 14/581,674

(22) Filed: Dec. 23, 2014

(65) Prior Publication Data

US 2016/0182302 A1    Jun. 23, 2016

(51) Int. Cl.
*H04W 8/00* (2009.01)
*H04L 29/08* (2006.01)
*H04L 12/58* (2006.01)
*H04L 29/06* (2006.01)
*H04L 12/24* (2006.01)
(Continued)

(52) U.S. Cl.
CPC .......... *H04L 41/12* (2013.01); *H04L 67/1063* (2013.01); *H04L 67/16* (2013.01); *H04W 8/005* (2013.01); *H04W 12/04* (2013.01); *H04W 12/08* (2013.01); *H04W 76/14* (2018.02); *H04L 51/32* (2013.01); *H04L 63/065* (2013.01); *H04L 67/1044* (2013.01)

(58) Field of Classification Search
CPC ............... H04L 61/303; H04L 61/1541; H04L 67/1065; H04L 67/104; H04L 61/1511; H04L 67/16; H04L 41/50; H04W 84/12; H04W 48/16; H04W 92/18; H04W 4/00
See application file for complete search history.

(56) References Cited

U.S. PATENT DOCUMENTS 7,730,216 B1    6/2010  Issa et al.
8,774,145 B2    7/2014  Lin et al.
(Continued)

FOREIGN PATENT DOCUMENTS

EP    1478134 A1    11/2004
TW    201108672 A    3/2011
WO    2012135424 A2    10/2012

OTHER PUBLICATIONS

R.O.C. Search Report, R.O.C. Patent Application No. 104138573, Completion date Jul. 27, 2016, 2 pages.
(Continued)

*Primary Examiner* — Redentor Pasia
*Assistant Examiner* — Peter K Mak
(74) *Attorney, Agent, or Firm* — International IP Law Group, P.L.L.C.

(57) ABSTRACT

A method for discovery of devices is described herein. The method includes connecting, via a processor, to a discovery node service. The method also includes sending, via the processor, a node name to the discovery node service. The method further includes sending, via the processor, data and content to be sent to a discovery node associated with the node name. The method also further includes receiving data and content from the discovery node, the data to include a list of devices subscribed to the discovery node.

14 Claims, 9 Drawing Sheets

(51) Int. Cl.
*H04W 12/08* (2009.01)
*H04W 12/04* (2009.01)
*H04W 76/14* (2018.01)

(56) References Cited

U.S. PATENT DOCUMENTS

| | | |
|---|---|---|
| 2002/0059379 A1 | 5/2002 | Harvey et al. |
| 2002/0156875 A1 | 10/2002 | Pabla |
| 2004/0083285 A1 | 4/2004 | Nicolson |
| 2004/0162896 A1* | 8/2004 | Cen .................. H04L 29/06 709/224 |
| 2005/0010640 A1* | 1/2005 | Cannata ............. G06Q 10/10 709/205 |
| 2005/0097386 A1 | 5/2005 | Datta et al. |
| 2008/0104274 A1 | 5/2008 | Axelsson et al. |
| 2008/0183853 A1* | 7/2008 | Manion ............. H04L 12/4641 709/223 |
| 2011/0047084 A1* | 2/2011 | Manzalini ........... G06F 9/505 705/301 |
| 2011/0137723 A1 | 6/2011 | Thorn |
| 2011/0213866 A1 | 9/2011 | Yoshimura et al. |
| 2012/0102073 A1 | 4/2012 | Patel et al. |
| 2012/0158553 A1 | 6/2012 | Sudhidhanakul et al. |
| 2012/0311642 A1 | 12/2012 | Ginn et al. |
| 2013/0282860 A1 | 10/2013 | Zhang et al. |
| 2015/0237511 A1* | 8/2015 | Jackson ................ H04W 24/02 455/423 |

OTHER PUBLICATIONS

R.O.C. Search Report, R.O.C. Patent Application No. 104138573, Completion date Mar. 20, 2017, 2 pages.
PCT International Search Report, PCT Application No. PCT/US2015/053413, dated Feb. 18, 2016, 4 pages.
Supplementary European Search Report for European Patent Application No. EP15873858 with a completion date of Jun. 28, 2018 and dated Jul. 6, 2018, 5 pages.
Supplementary European Search Report for related EP Application EP15873858 dated Sep. 19, 2018, 2 pages.

* cited by examiner

DEVICE DISCOVERY USING DISCOVERY NODES

TECHNICAL FIELD

The present invention relates generally to device discovery. More specifically the present invention relates to techniques for discovery of devices using discovery nodes.

BACKGROUND

Some networking protocols are defined for service discovery when devices are either in direct radio range or on routable networks. However, when services are implemented using the cloud, there are few solutions available that provide tools for discovery that can be modified based on contextual usages. For example, an instructor may want a discovery network that is conducive to learning while a group of businesspeople may want to setup a meeting at an airport with appropriate access control.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

In the following description and claims, the term "discovery node" along with its derivatives, may be used. It should be understood that this term may refer to a programmatic concept that can be used to create a way for interested parties to discover something. Furthermore, the Internet of Things (IoT) may refer to an interconnection of uniquely identifiable embedded computing devices within an existing network infrastructure, such as the Internet. Finally, the terms "client" or "discovery node client" may be used interchangeably, and refer to a device capable of connecting to a discovery node.

Techniques for discovering devices using discovery nodes with particular node names are provided herein. One or more clients may connect to a server and provide a discovery node service a node name. Based in part on the provided node name, the clients may create new discovery nodes, join and/or subscribe to existing discovery nodes, and leave discovery nodes. In some examples, the discovery nodes can be used to discovery other devices based on location or point of interest. The discovery nodes can also be used to discover whether connections of a user on a social network are online or offline. Furthermore, the discovery nodes can be used by a presentation application to discover clients in the audience but limit the ability of the audience clients to discover each other. Thus, techniques described herein provide a flexible system and method for implementing discovery in cloud-based networks. Example contextual usages described below include a virtual lobby, a presentation, and a meeting at an airport.

Some embodiments may be implemented in one or a combination of hardware, firmware, and software. Some embodiments may also be implemented as instructions stored on a computer readable medium, which may be read and executed by a computing platform to perform the operations described herein. A computer readable medium may include any mechanism for storing or transmitting information in a form readable by a machine, e.g., a computer. For example, a computer readable medium may include read only memory (ROM); random access memory (RAM); magnetic disk storage media; optical storage media; flash memory devices; or the interfaces that transmit and/or receive signals, among others.

An embodiment is an implementation or example. Reference in the specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the inventions. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
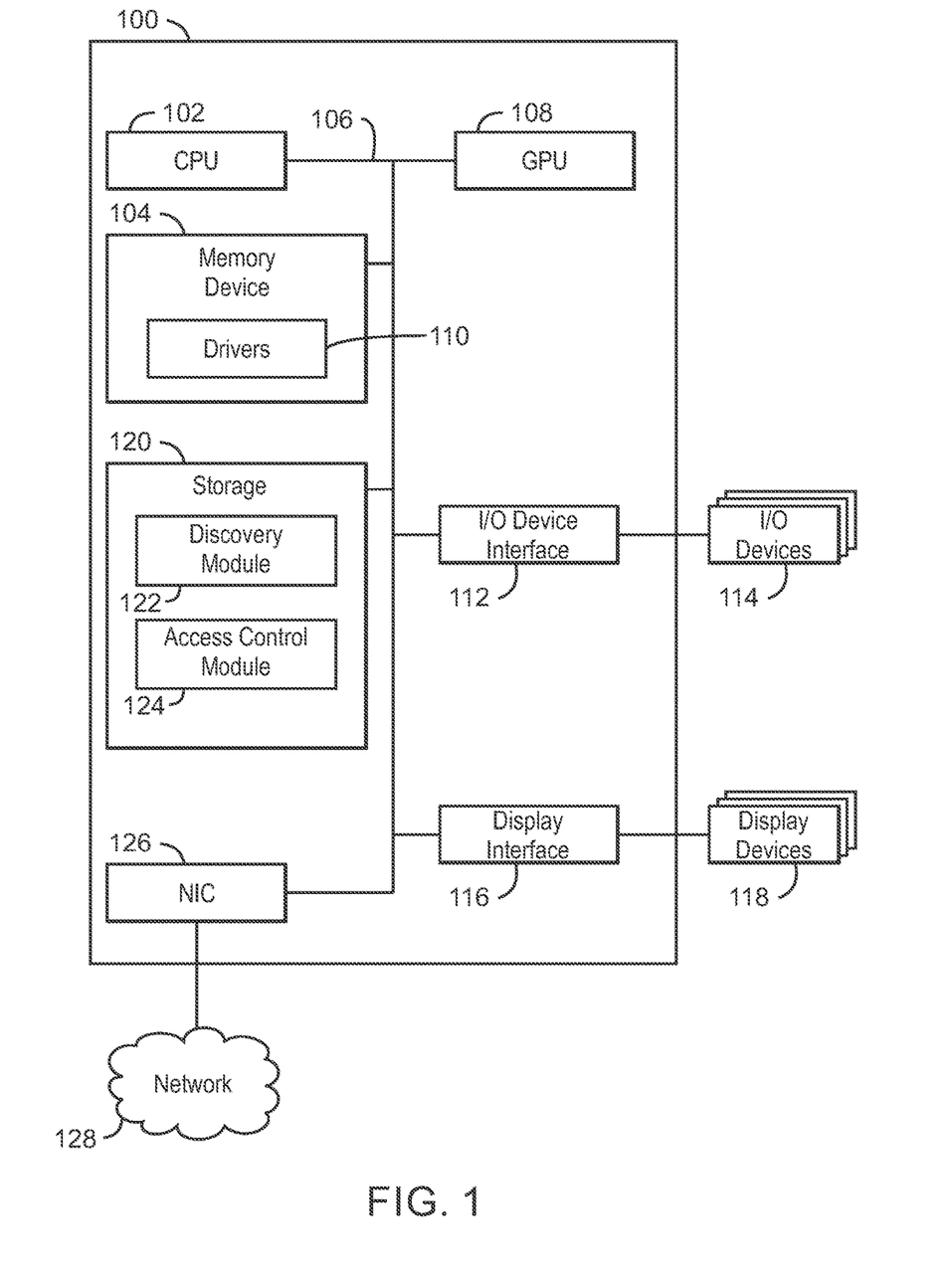
FIG. 1 is a block diagram illustrating an example computing device that can be used as a node for discovery of devices.

FIG. 1 is a block diagram illustrating an example computing device that can be used as a node for discovery of devices. The computing device 100 may be, for example, a laptop computer, desktop computer, tablet computer, mobile device, or server, among others. The computing device 100 may include a central processing unit (CPU) 102 that is configured to execute stored instructions, as well as a memory device 104 that stores instructions that are executable by the CPU 102. The CPU 102 may be coupled to the memory device 104 by a bus 106. Additionally, the CPU 102 can be a single core processor, a multi-core processor, a computing cluster, or any number of other configurations. Furthermore, the computing device 100 may include more than one CPU 102. The memory device 104 can include random access memory (RAM), read only memory (ROM), flash memory, or any other suitable memory systems. For example, the memory device 104 may include dynamic random access memory (DRAM).

The computing device 100 may also include a graphics processing unit (GPU) 108. As shown, the CPU 102 may be coupled through the bus 106 to the GPU 108. The GPU 108 may be configured to perform any number of graphics operations within the computing device 100. For example, the GPU 108 may be configured to render or manipulate graphics images, graphics frames, videos, or the like, to be displayed to a user of the computing device 100.

The memory device 104 can include random access memory (RAM), read only memory (ROM), flash memory, or any other suitable memory systems. For example, the memory device 104 may include dynamic random access memory (DRAM). The memory device 104 may include device drivers 110 that are configured to execute the instructions for device discovery. The device drivers 110 may be software, an application program, application code, or the like.

The CPU 102 may also be connected through the bus 106 to an input/output (I/O) device interface 112 configured to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 100, or may be devices that are externally connected to the computing device 100. In some examples, the memory 104 may be communicatively coupled to I/O devices 114 through direct memory access (DMA).

The CPU 102 may also be linked through the bus 106 to a display interface 116 configured to connect the computing device 100 to a display device 118. The display device 118 may include a display screen that is a built-in component of the computing device 100. The display device 118 may also include a computer monitor, television, or projector, among others, that is internal to or externally connected to the computing device 100.

The computing device also includes a storage device 120. The storage device 120 is a physical memory such as a hard drive, an optical drive, a thumbdrive, an array of drives, or any combinations thereof. The storage device 120 may also include remote storage drives. The storage device 120 includes a discovery module 122 and an access control module 124. The discovery module 122 may be used to enable discovery of devices using discovery nodes. For example, the discovery module 122 can receive a node name and data from a first discovery node client. The discovery module 122 can create a discovery node using the node name. The discovery node can be used to discover devices connected to the discovery node. The discovery module 122 can also receive a connection request with the node name from a second client. The discovery module 122 can then send the data to the second client. In some examples, the data can include a device id that is used by the second client to connect with the first client. The data can also include access control information that may be used to limit access to the discovery node. The data can also include discovery node configuration data. For example, the discovery node configuration data can be used to configure a discovery node based on various contexts. Such contexts can include geographical proximity, presentation, virtual location, and social networking, among others. The discovery module 122 can receive content from the second client and send the content to the first client. The access control module 124 may be used to disconnect the first or second device after receiving a request to disconnect. In some examples, the discovery module 122 can also delete the discovery node when no clients are connected to the discovery node.

The computing device 100 may also include a network interface controller (NIC) 126. The NIC 126 may be configured to connect the computing device 100 through the bus 106 to a network 128. The network 128 may be a wide area network (WAN), local area network (LAN), or the Internet, among others. In some examples, the device may communicate with other devices through a wireless technology. For example, Bluetooth® or similar technology may be used to connect with other devices.

The block diagram of FIG. 1 is not intended to indicate that the computing device 100 is to include all of the components shown in FIG. 1. Rather, the computing system 100 can include fewer or additional components not illustrated in FIG. 1, such as sensors, power management integrated circuits, additional network interfaces, and the like. The computing device 100 may include any number of additional components not shown in FIG. 1, depending on the details of the specific implementation. Furthermore, any of the functionalities of the CPU 102 may be partially, or entirely, implemented in hardware and/or in a processor. For example, the functionality of the discovery module 122 and the access control module 124 may be implemented with an application specific integrated circuit, in logic implemented in a processor, in logic implemented in a specialized graphics processing unit, or in any other device.

Figure 2:
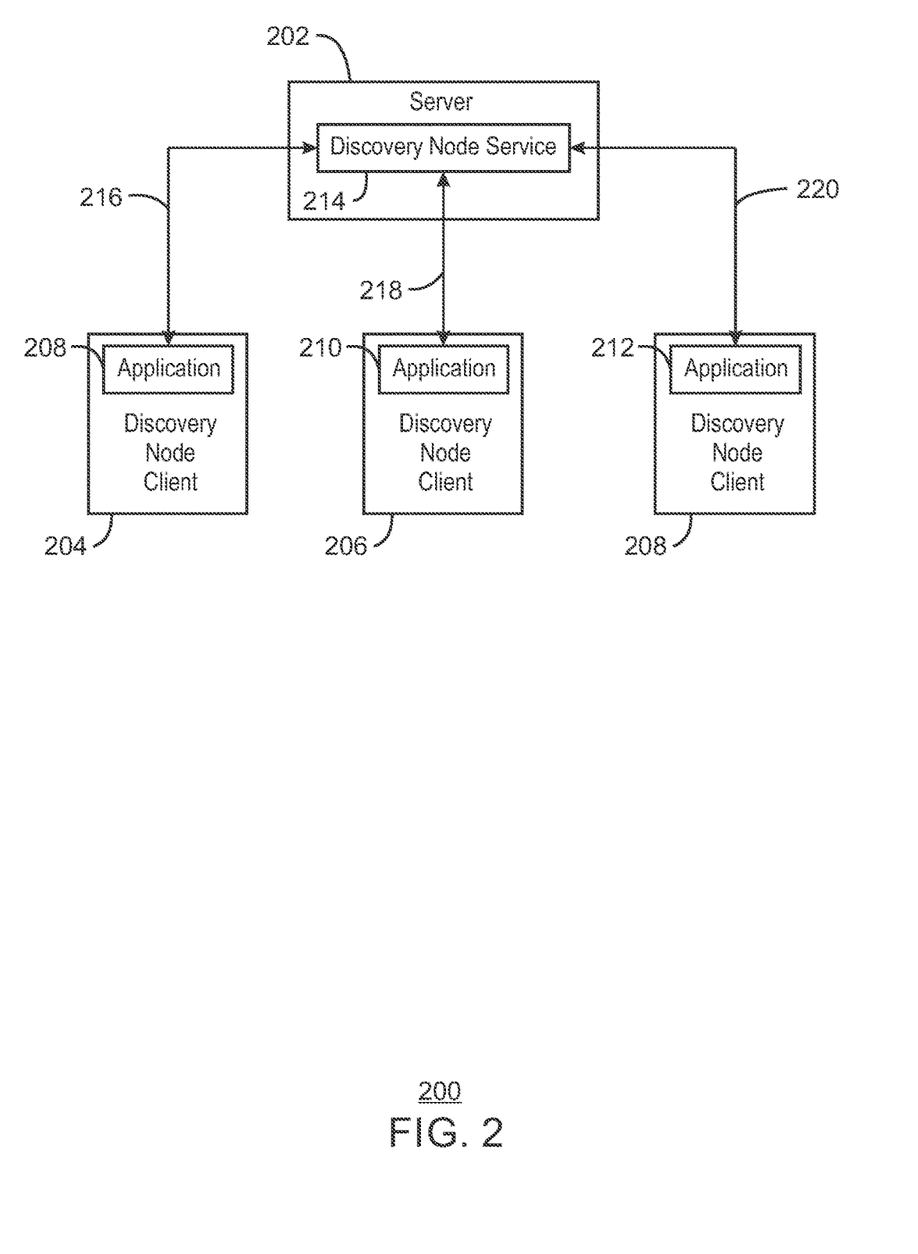
FIG. 2 is a block diagram illustrating an example system that can be used to discover devices.

FIG. 2 is a block diagram illustrating an example system 200 that can be used to discover devices. In FIG. 2, the example system 200 includes a server 202 and discovery node clients 204, 206, and 208. The discovery node clients 204, 206, and 208 include applications 208, 210, and 212, respectively. The server 202 includes a discovery node service 214. The discovery node service 214 is connected to applications 208, 210, and 212, via network connections 216, 218 and 220, respectively.

The discovery node service 214 may include a database that holds data related to existing discovery nodes, content published to discovery nodes, and subscribers to each discovery node. For example, the server 202 can use the Extensible Messaging and Presence Protocol (XMPP), the Common Connector Framework (CCF), the rendezvous protocol, or the like. The discovery node service 214 may include functionality allowing devices to connect to the service, create discovery nodes, configure security and access policies, subscribe to discovery nodes, and publish to the discovery nodes. For example, the discovery node client 204 may connect to the discovery node service 214 via application 208 and create a discovery node with a particular node name. The node client 204 may publish data to be shared with other discovery node clients to the discovery node service 214. Additional discovery node clients 206, 208 may connect to the discovery node service via their applications 210, 212. The applications 208, 210, and 212 may be the same on all three discovery node clients 204, 206, and 208, and may include an instant messaging application, a voice communication application, a video application, or a conferencing application, among others. In some examples, if node clients 206, 208 provide the discovery node service 214 the particular node name that was created by discovery node client 204, then discovery node clients 206, 208 can subscribe to the discovery node with that particular node name. The discovery node clients 206, 208 may then receive the data that discovery node client 204 published to the discovery node. In some examples, data that is later published by discovery node client 204 to a particular discovery node can automatically be pushed to the discovery node clients 206, 208 subscribed to that discovery node.

In some examples, the discovery node service 214 can receive a security and access policy for a particular discovery node from the discovery node client 204. For example, different types of security policies can be used to secure the discovery node from random connections. Such security policies can include the use of media access control (MAC) address based codes, encryption-based systems, and certificate exchanges, and the like. For example, a discovery client node can publish a list of MAC addresses of devices that are allowed to subscribe to the discovery node with the node name.

Figure 3:
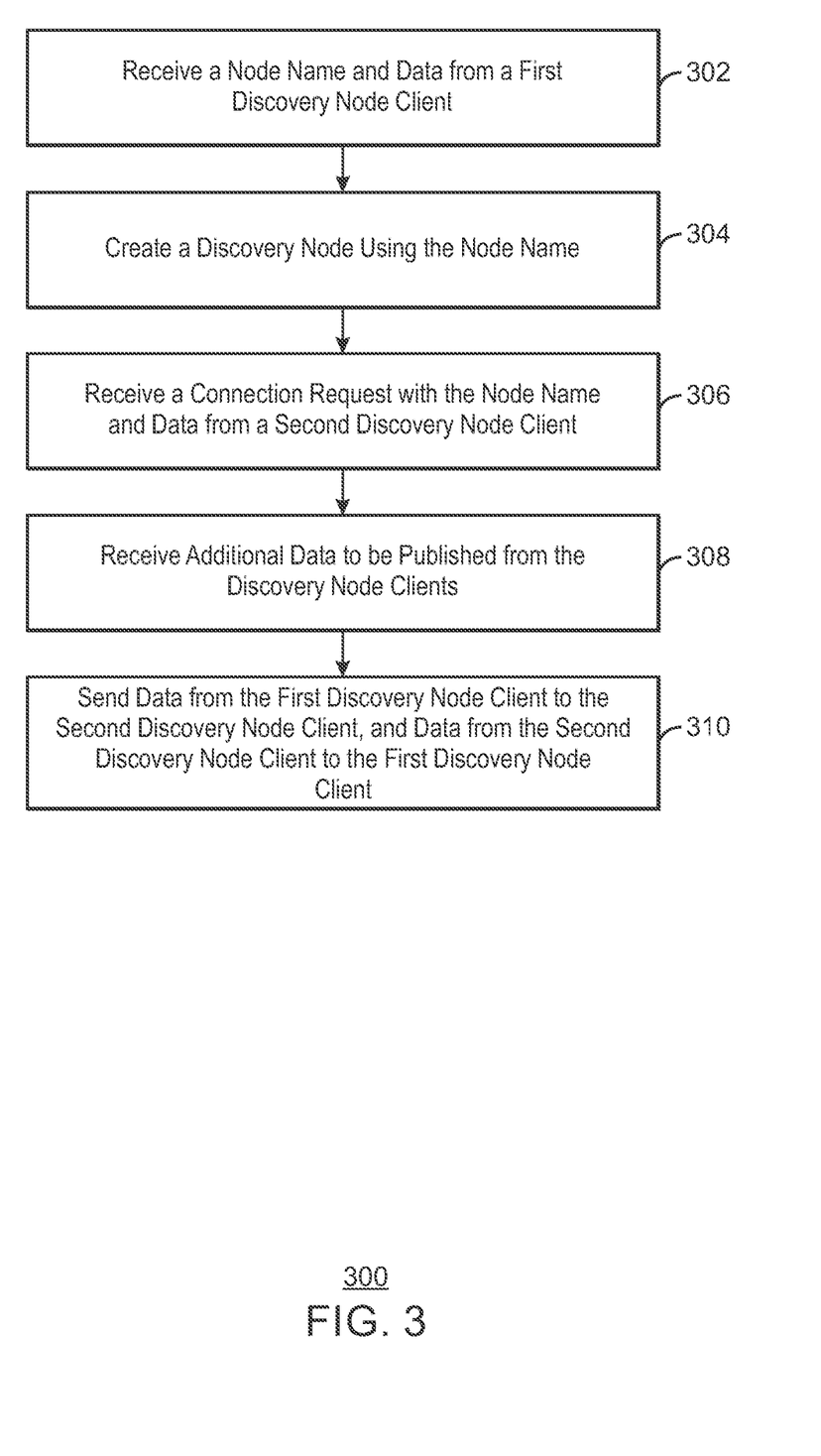
FIG. 3 is a process flow diagram illustrating an example method that depicts server-side functionality for discovering devices.

FIG. 3 is a process flow diagram illustrating an example method that depicts server-side functionality for discovering devices. The example method of FIG. 3 is generally referred to by the reference number 300 and is discussed with reference to FIG. 2.

At block 302, a discovery node service 214 receives a node name and data from a first discovery node client 204. For example, the application 208 may send a node name with additional data to the discovery node service 214 of server 202. The data can include device information such as a MAC address, IP address, or any other suitable form of device information. The data can also include access control information, such as passwords, user names, tokens, and the like. The discovery node service 214 can then test for existence of the node. When no discovery node already exists using the received node name, then the discovery node service 214 may proceed to block 304. When a discovery node already exists with the received node name, then the first discovery node client may be connected to the discovery node with the received node name.

At block 304, the discovery node service 214 creates a discovery node using the node name. For example, if no discovery node already exists with the node name received from the first discovery node client 204, then the discovery node service may create a discovery node associated with the node name. The information from the first discovery node client 204 may then be used to indicate the device or person associated with the first discovery node client as an owner of the discovery node. Additional discovery node clients may then subscribe to the discovery node using the node name and receive data that is published by other discovery node clients.

At block 306, the discovery node service 214 receives a connection request with the node name and data from a second discovery node client. For example, the second discovery node client 206 may have connected to the discovery node service 214 at a later time than the first discovery node client 204. The discovery node service 214 can locate the discovery node associated with the node name and send the data to the discovery node associated with the node name. In some examples, one or more access control techniques may be used to control access to discovery node clients. For example, a MAC address filter can be used to allow or deny access to specific discovery node client devices. In some examples, a user name and password can be used by a discovery node service 214 to limit access to discovery node clients providing a user name and password.

At block 308, the discovery node service 214 receives additional data to be published from the discovery node clients. In some examples, the first discovery node client 204 and the second discovery node client 206 sends data to each other via the discovery node. For example, the discovery node may receive data from the first discovery node client 204 or the second discovery node client 206 and sends the data to other discovery node clients subscribed to the discovery node.

At block 310, the discovery node service 214 sends data from the first discovery node client to the second discovery node client, and data from the second discovery node client to the first discovery node client. Data received from a discovery node client that is to be published may be sent to all the other discovery node clients that are subscribed to the discovery node. In some examples, a discovery node client may not publish any data, but rather receive published data from other discovery node clients. For example, the discovery node client 208 may subscribe to a discovery node with a particular name and receive published data from discovery node client 204 and discovery node client 206.

In some examples, data can be communicated over the discovery node itself between subscribers and publishers. In some examples, a connection request is received from a peer to setup a dedicated connection with a subset of peers that has joined a given node. For example, a peer can be any one of the discovered clients connected to a discovery node.

This process flow diagram is not intended to indicate that the blocks of the method 300 are to be executed in any particular order, or that all of the blocks are to be included in every case. For example, if a discovery node associated with a particular node name already exists, then a new discovery node will not be created as in block 304. Instead, the discovery node client will be connected with the discovery node associated with the node name. Further, any number of additional blocks not shown may be included within the method 300, depending on the details of the specific implementation.

Figure 4:
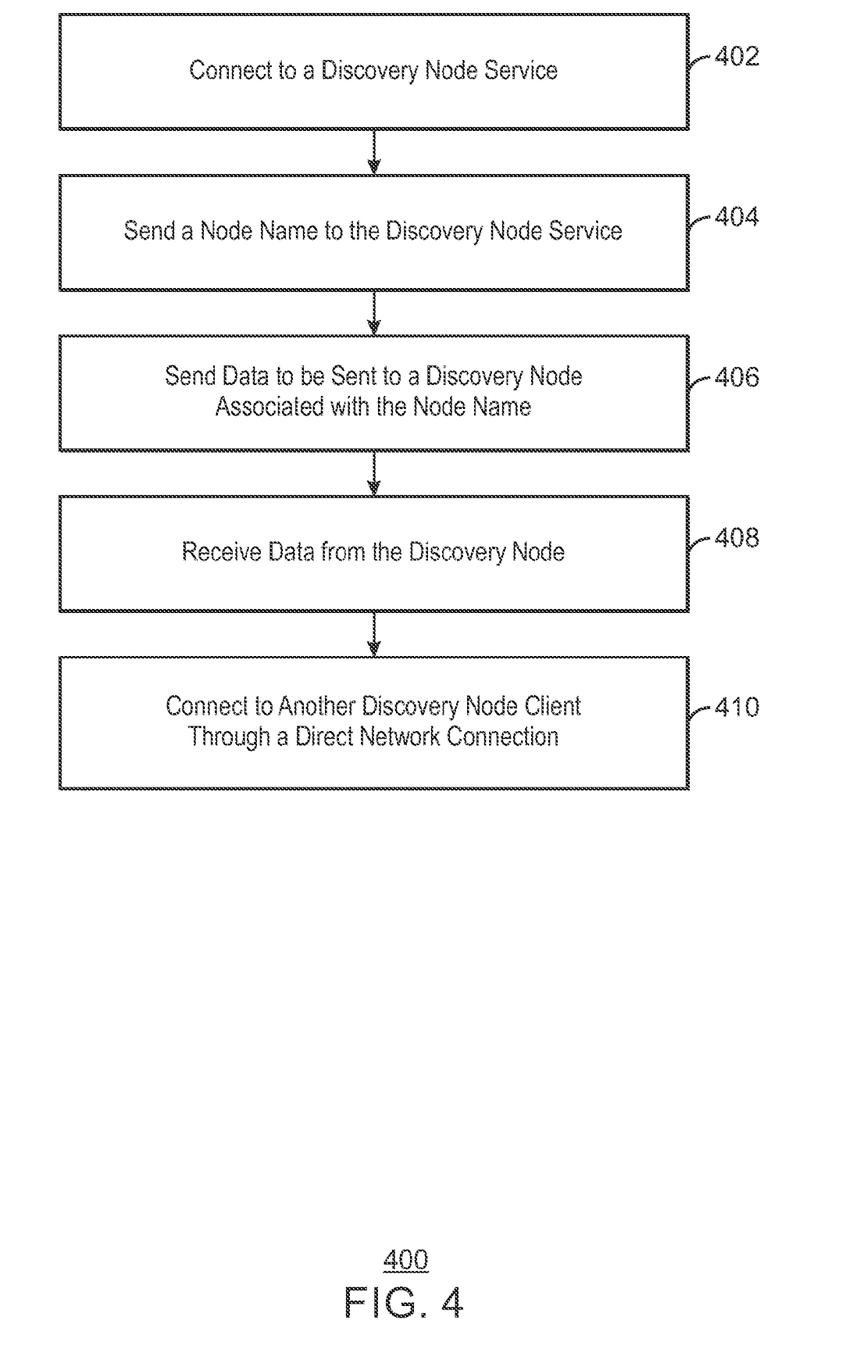
FIG. 4 is a process flow diagram illustrating an example method that depicts client-side functionality for discovering devices.

FIG. 4 is a process flow diagram illustrating an example method 400 that depicts client-side functionality for discovering devices. The example method of FIG. 4 and can be executed by the applications 208, 210, 212 of the discovery node clients 204, 206, and 208 of FIG. 2.

At block 402, an application 208 connects to a discovery node service 214. In some examples, the discovery node service 214 may request a node name from the application. In addition, the clients 206, 208 may contain client side software developer kit (SDK) libraries that implement client side functionality of the discovery node functionality. For example, the functionality implemented on the client side can include data serialization, connection logic, and modeling, among other functionalities. The SDK may include the following primitives with corresponding parameters for using discovery nodes: CreateNode (name, options), Join- Node(name, options), LeaveNode(name), AddItem(name, data), RemoveItem(name, data), OnNodeUpdate(name, data). For example, the name parameter may refer to the node name, the data parameter may refer to a file or content to be added, removed, or updated, and the options parameter may refer to additional parameters that may be included. For example, access control parameters may be included.

At block 404, the application 208 sends a node name to the discovery node service 214. For example, the node name may be the name of a node to be created or the name of a node to be connected to. In some examples, if a discovery node with the node name does not exist, then the application 208 may receive an option to create a discovery node with that node name. The application may also send credentials to access an access-controlled discovery node. For example, the credentials can include a user name and password or a MAC address. In some examples, the application 208 may subscribe to additional discovery nodes by sending an additional node names to the discovery node service. Creating a discovery node may involve a policy around authorization/access control. For example, controlling who can join the discovery node and what permissions those principals has in terms of subscribing, publishing, etc. The mechanism in which authorization is granted can be based on a variety of standard mechanisms.

At block 406, the application 208 sends content to be sent to a discovery node associated with the node name. In some examples, the data can include a user name and/or a friendly name. For example, a friendly name can be a shortened form of the user name such as a nickname. In some examples, the data can include endpoint and contact data. For example, endpoint and contact data can define how the 208 application can reach another application 210, 212 via Session Initiation Protocol (SIP) or Extensible Messaging and Presence Protocol (XMPP) servers, push services for sending push notifications or invitations, network endpoints, among other data. The content may include one or more services. For example, the services can include instant messaging, voice services, and teleconferencing services. The content may also include an avatar and/or profile picture.

At block 408, the application 208 receives data and content from the discovery node. For example, the data can include a list of devices subscribed to the discovery node. In some examples, the data can include a list of other discovery node clients subscribed to the discovery node. The content may be content published by one or more of the discovery node clients. The application 208 may then receive content published by other clients as it is published.

At block 410, the application 208 connects to another discovery node client through a direct network connection. For example, the application of a first discovery node client may connect with an application of a second node client. The first discovery node client can send a direct connection request to one of the discovered clients that has also joined the same discovery node. The first node client may connect with the second node client by using data obtained from the discovery node. For example, the data may include authentication information, application information, and the like. In some examples, a direct network connection can be used for sharing content with a byte size greater than a threshold size. The direct network connection may be used for services using a threshold amount of bandwidth. For example, video conferencing services may use a direct network connection. The direct network connection may be an encrypted network connection. The application 208 can also disconnect from a discovery node and no longer receive data from the discovery node service.

This process flow diagram is not intended to indicate that the blocks of the method 400 are to be executed in any particular order, or that all of the blocks are to be included in every case. Further, any number of additional blocks not shown may be included within the method 400, depending on the details of the specific implementation.

Figure 5:
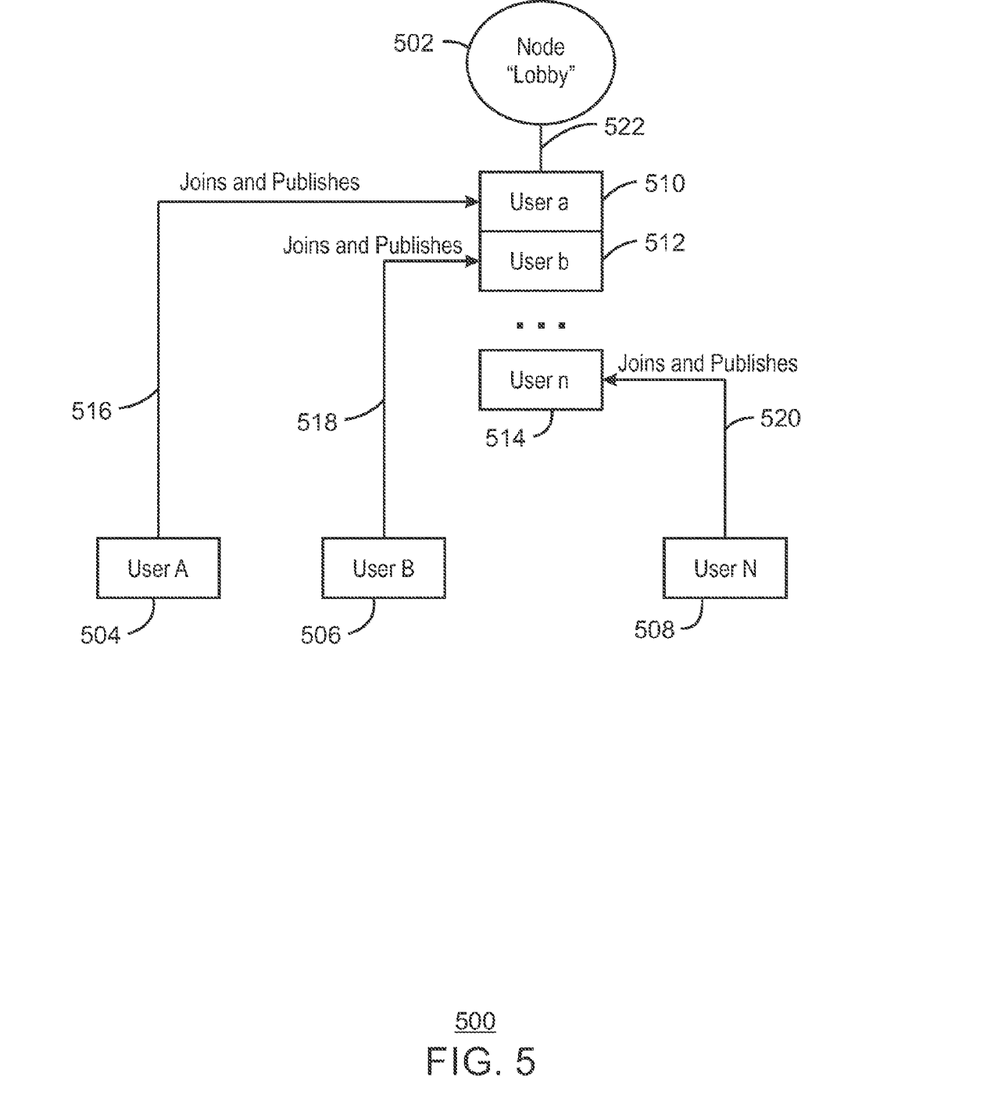
FIG. 5 is a block diagram of an example system providing for a virtual lobby according to the techniques described herein.

FIG. 5 is a block diagram of an example system 500 providing for a virtual lobby according to the techniques described herein. A virtual lobby, as used herein, refers to a publicly available discovery node used for discovery of devices. In FIG. 5, the example system 500 includes a discovery node named "Lobby" 502. The system 500 also includes discovery node clients 504, 506, and 508, that are connected to data 510, 512, 514 of the discovery node 502 via connections 516, 518, 520, respectively. The discovery node "Lobby" 502 includes data 510, 512, 514 as indicated by connection 522.

In example system 500, a "Lobby" discovery node 502 was created to allow discovery of clients using an application in the context of a particular virtual area. For example, the application can be a "chat" application that creates different virtual rooms with different topics. In some examples, the application may have nodes for clients of different ranks. For example, clients with a particular rank may be able to communicate with each other via a particular discovery node for that particular rank. The clients may also be able to send files depending on the application. Applications subscribing to the "Lobby" discovery node 502 can see all the other clients that have subscribed to the "Lobby" discovery node 502. Furthermore, each client may send one or more pieces of content and have the content published to all the other subscribing clients via the single "Lobby" discovery node 502.

Figure 6:
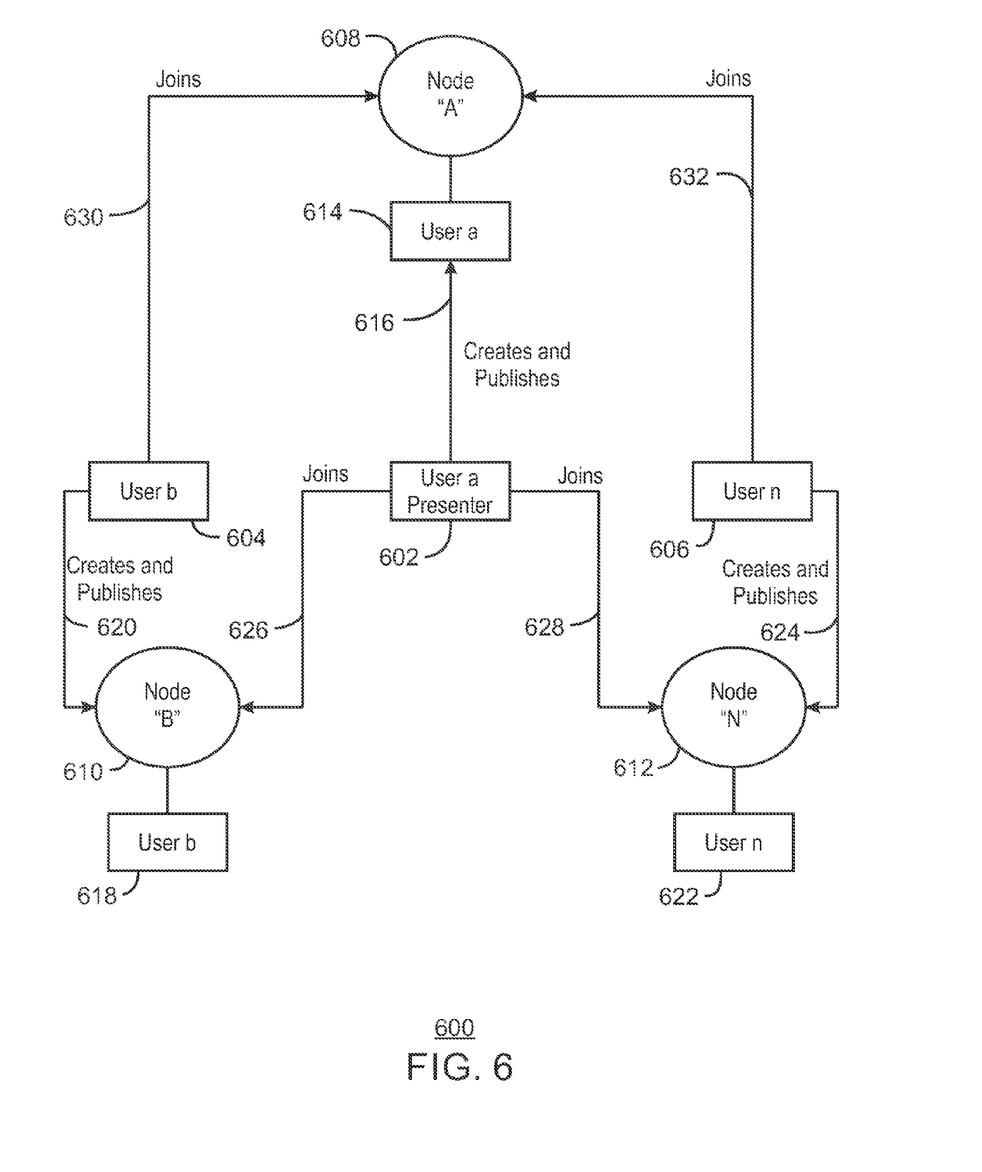
FIG. 6 is a block diagram of an example system providing for a presentation according to the techniques described herein.

FIG. 6 is a block diagram of an example system 600 providing for a presentation according to the techniques described herein. In FIG. 6, the example system 600 includes three discovery node clients 602, 604, and 606, connected to discovery nodes 608, 610, and 612. The discovery node 608 includes content 614 received from client 602 via network connection 616. The discovery node 610 includes content 618 received from client 604 via network connection 620. The discovery node 612 includes content 622 received from client 606 via network connection 624. Moreover, client 602 is also connected to discovery node 610 and discovery node 612 via network connections 626 and 628, respectively. Client 604 and client 606 are also connected to discovery node 608 via network connections 630 and 632, respectively.

In the example system 600, the context of the application being run by clients 602, 604, and 606, can be any type of presentation. For example, the application may be a teacher/classroom type application. In some examples, a presenter creates a first discovery node 608. The members of the audience represented by client 604 or 606 can then also create discovery nodes 610 and 612, respectively. In some examples, the clients 604 and 606 can send and thus publish content to discovery nodes 610 and 612. The presenter client 602 can then read published content 618, 622 by joining, or subscribing to, discovery nodes 610, 612 via network connections 626, 628. Furthermore, the audience clients 604, 606 can subscribe to discovery node 608 and thus receive presenter content 614 via network connections 630 and 632. Thus, in the example system of 600, the audience clients 604, 606 can receive and display content 614 from presenter client 602. The presenter client 602 can also receive and display content 618, 622 from audience clients 604, 606. However, the audience clients 604, 606 cannot receive content from each other nor see each other. Therefore, discovery nodes 608, 610, 612 enable networking with asymmetrical sharing. Moreover, computer resources and network bandwidth may be saved by not sharing content of every discovery node with all discovery node clients.

Figure 7:
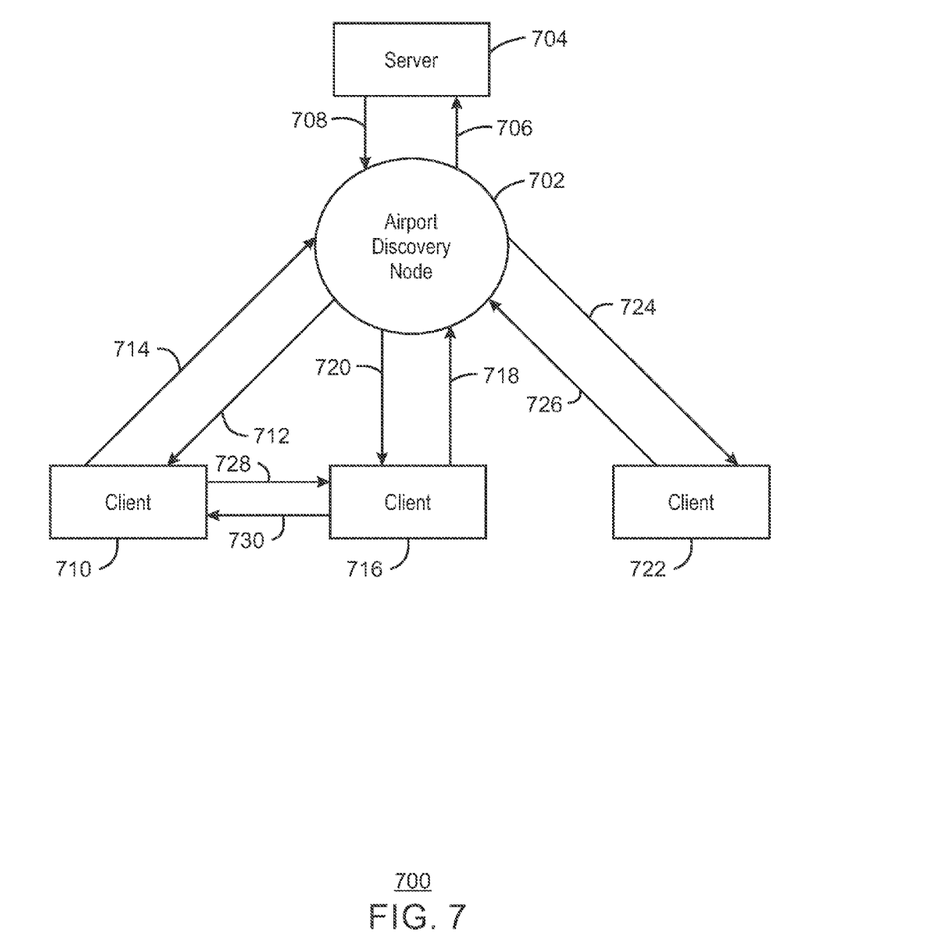
FIG. 7 is a block diagram of an example system providing for discovering devices at an airport according to the techniques described herein.

FIG. 7 is a block diagram of an example system 700 providing for discovering devices at an airport according to the techniques described herein. In FIG. 7, a single discovery node 702 named "Airport" is connected to a server 704 via network connections 706 and 708. The discovery node 702 is also connected to a client 710 via network connections 712 and 714. The discovery node 702 is also connected to a client 716 via network connections 718 and 720. The discovery node is further connected to client 722 via network connections 724 and 726. Client 710 is also connected to client 716 via network connections 728 and 730.

In the example of system 700, three clients 710, 716, 722 may arrive at different times to an airport. Each client may have a proximity application that can be used to create discovery nodes based on the context of a geodesic location or a geographical point of interest such as an airport. For example, client 710 may have arrived first. The client 710 may have created an "Airport" discovery node 702 by sending a request including a node name "Airport" to the server 704. For example, server 704 may include a discovery node service. In some examples, a second client 716 may arrive at the airport after client 720 and send a request to connect with the node name "Airport" to the server 704. The server 704 can then connect client 716 to the discovery node 702. Client 716 may discover client 710 via discovery node 702 and receive content from client 710 via discovery node 702. Client 716 can create a direct network connection with client 710 using data received from discovery node 702. For example, the data can include a MAC address, encryption connection information, or other details about client 710. Thus, the clients may be able to discover each other as they arrive at the geographical location of the airport. Larger files or services that use greater bandwidth can be shared using the direct network connections 728 and 730. Therefore, disk space and bandwidth are saved by not transferring files or streaming data via server 704.

Figure 8:
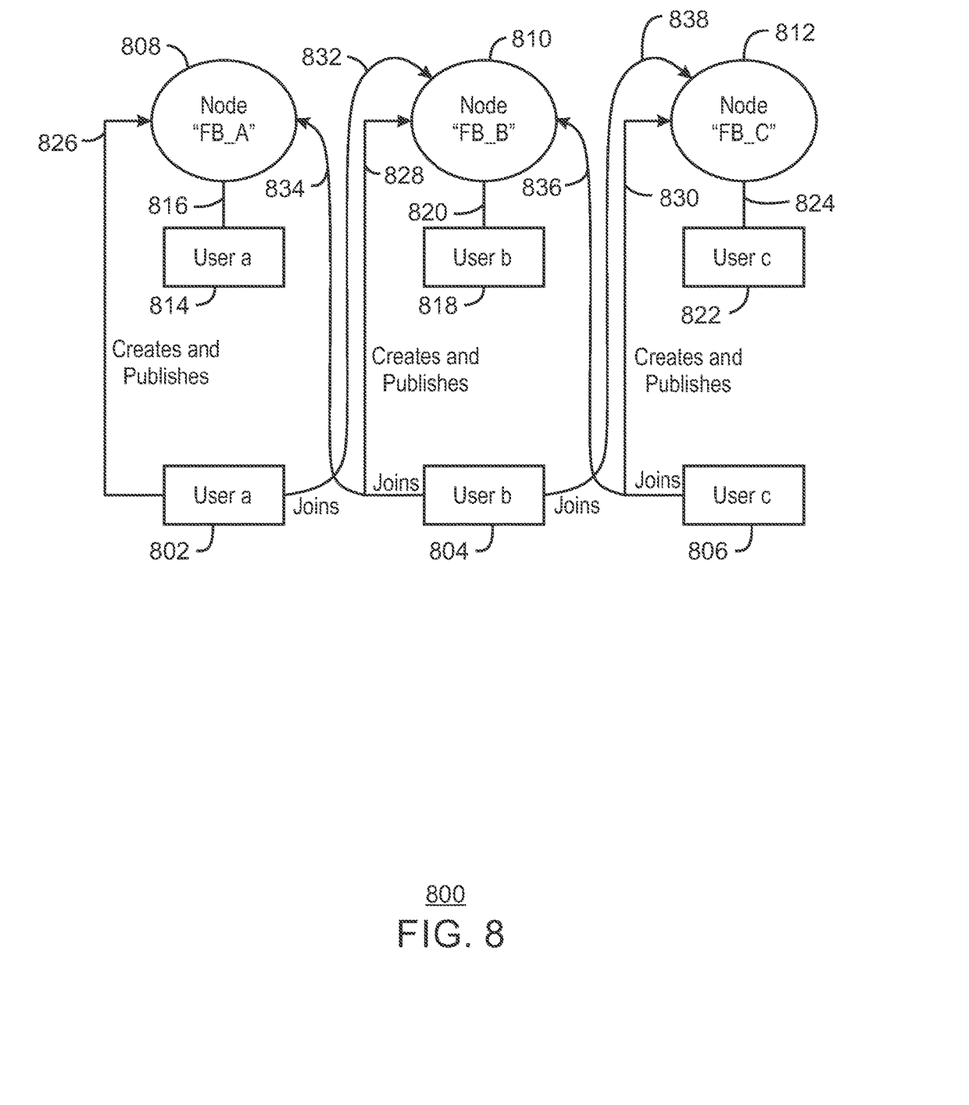
FIG. 8 is a block diagram of an example system providing for discovering devices that are connected to a social network according to the techniques described herein.

FIG. 8 is a block diagram of an example system 800 providing for discovering devices that are connected to a social network according to the techniques described herein. In FIG. 8, three clients 802, 804, and 806 are connected to three discovery nodes 808, 810, and 812. The discovery node 808 includes content 814 from user 802 as indicated by line 816. The discovery node 810 includes content 818 from client 804 as indicated by line 820. The discovery node 812 includes content 822 from client 806 as indicated by line 824. Clients 802, 804, and 806 are connected to discovery nodes 808, 810, 812 respectively via network connections 826, 828, 830. The client 802 is also connected to discovery node 810 via network connection 832. Furthermore, the client 804 is connected to discovery node 808 via network connection 834. The client 806 is connected to discovery node 810 via network connection 836. The client 804 is also further connected to the discovery node 812 via network connection 838.

In the example system 800, an application being used by clients 802, 804, and 806 is linked to a social network. In some examples, for each client, the application downloads the friend/contact list of the associated user from the social network. In some examples, a discovery node 808, 810, or 812 is created for each client 802, 804, or 806 using the associated user's unique social ID. For example, the social ID may be the same ID used on the linked social network. In some examples, the application can then traverse through the friend/contact list of the linked social network. The application can then attempt to connect to discovery nodes associated with friends or contacts from the list. For example, friends or contacts that are online will have an associated discovery node created and the application can connect to those associated discovery nodes using the appropriate node name. Thus, a client 802 can join the discovery node 810 created by a client 804 via a connection 832. A client 804 can join discovery nodes 808 and 812 created by clients 802 and 806, respectively, via connections 834 and 838. The client 806 can also join the discovery node 810 created by the client 804. In some examples, the clients 802, 804, 806 may subscribe to the one or more discovery nodes that they have joined.

In some examples, a server may assist in pushing the discovery items to all of the subscribed clients of a discovery node. For example, in the example of 800, the client 802 may be friends with client 804. Furthermore, client 804 can be friends with both client 802 and client 806. In some examples, client 802 can create a discovery node 808 and join discovery node 810. The client 804 can create a discovery node 810 and join discovery nodes 808 and 812. The client 806 can create a discovery node 812 and join discovery node 810 of the client 804. Because the friend relationships are bidirectional, no race conditions exist. For example, the client 802 is friends with a client 804, and vice versa. Therefore, if client the 802 attempts to connect to the discovery node 810 of the client 804 before the discovery node 810 has been created, then the client 802 may receive a notification when the client 804 later comes online and joins the discovery node 808 of the client 802. The client 802 can then join the discovery node 810 of the client 804. Thus, the clients may be able to automatically discover who is offline or online at any point in time.

Figure 9:
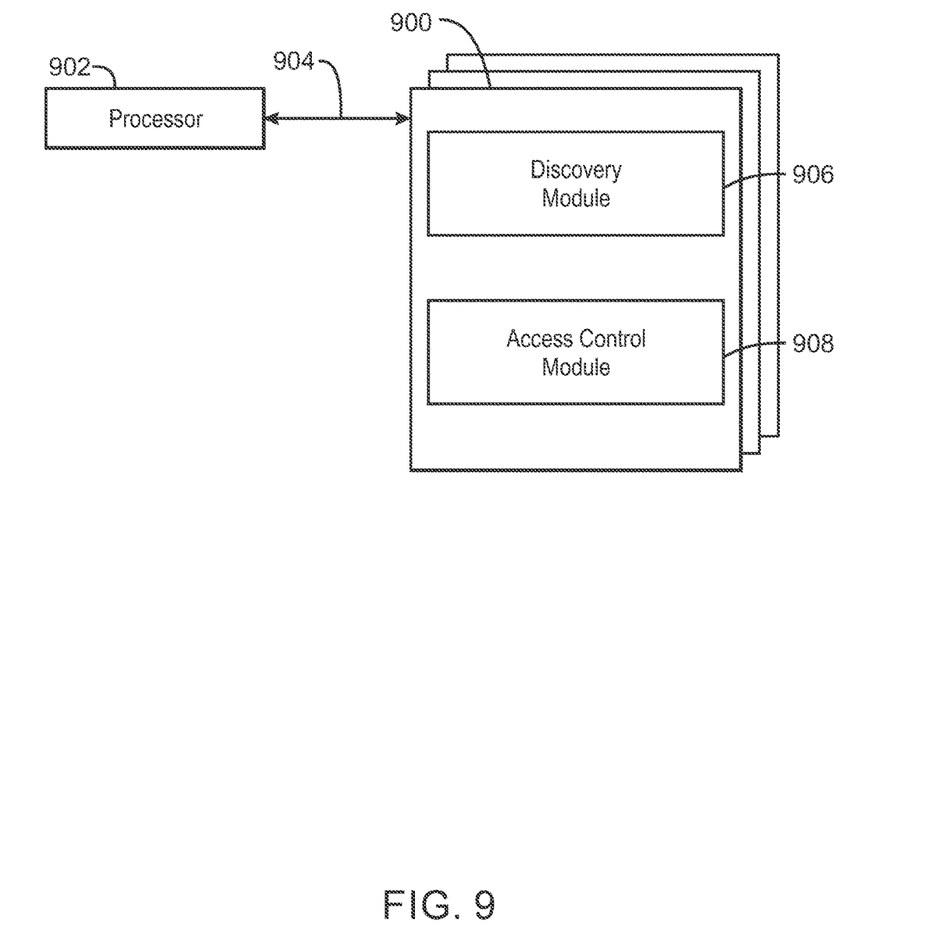
FIG. 9 is a block diagram showing computer readable media that store code for discovery of devices.

FIG. 9 is a block diagram showing computer readable media 900 that store code for discovery of devices. The computer readable media 900 may be accessed by a processor 902 over a computer bus 904. Furthermore, the computer readable medium 900 may include code configured to direct the processor 902 to perform the methods described herein. In some embodiments, the computer readable media 900 may be non-transitory computer readable media. In some examples, the computer readable media 900 may be storage media. However, in any case, the computer readable media do not include transitory media such as carrier waves, signals, and the like.

The block diagram of FIG. 9 is not intended to indicate that the computer readable media 900 is to include all of the components shown in FIG. 9. Further, the computer readable media 900 may include any number of additional components not shown in FIG. 9, depending on the details of the specific implementation.

The various software components discussed herein may be stored on one or more computer readable media 900, as indicated in FIG. 9. For example, a discovery module 906 may be configured to connect, via a processor, to a discovery node service. In some examples, the discovery module 906 may send, via the processor, a node name to the discovery node service. The discovery module 906 may send, via the processor, data and content to a discovery node associated with the node name. The discovery module 906 may also receive, via the processor, data and content from the discovery node. For example, discovery module 906 can receive data including a list of other clients and content published by the clients. The discovery module 906 can also connect, via the processor, to another discovery node client through a direct network connection. An access control module 908 may be configured to connect to another discovery node client via an encrypted network connection.

In some examples, the discovery module 906 may request creation of a discovery node. For example, if a discovery node with a particular node name does not exist, a client may send a request that a discovery node be created using the node name. The discovery module 906 can also include instructions to disconnect from a discovery node. For example, the processor may no longer receive data from the discovery node service once the instructions to disconnect have been received by the discovery node service. In some examples, the discovery module 906 can include instructions to send a request to delete previously sent data or content. The discovery module 906 may also include instructions to subscribe to an additional discovery node by sending an additional node name to the discovery node service.

The block diagram of FIG. 9 is not intended to indicate that the computer readable media 900 is to include all of the components shown in FIG. 9. Further, the computer readable media 900 may include any number of additional components not shown in FIG. 9, depending on the details of the specific implementation.

Example 1 is a system for discovery devices. The system includes a memory that is to store instructions. The system also includes a processor communicatively coupled to the memory, wherein when the processor is to execute the instructions, the processor is to receive a node name and data from a first discovery node client. Additionally, when the processor is to execute the instructions, the processor is to create a discovery node using the node name. The discovery node is to be used to discover devices connected to the discovery node. Additionally, when the processor is to execute the instructions, the processor is to receive a connection request with the node name from a second discovery node client. Additionally, when the processor is to execute the instructions, the processor is to send the data to the second discovery node client.

Example 2 incorporates the subject matter of Example 1. In this example, the data may include a device id. The device id is used by the second discovery node client to connect with the first discovery node client.

Example 3 incorporates the subject matter of any combination of Examples 1-2. In this example, the data includes access control information to be used to limit access to the discovery node.

Example 4 incorporates the subject matter of any combination of Examples 1-3. In this example, the data includes discovery node configuration data. The discovery node configuration data is used to configure the discovery node based on a context. For example, the context can include a presentation, a meeting at an airport or other geographical location, a meeting in a virtual lobby, or a social networking context.

Example 5 incorporates the subject matter of any combination of Examples 1-4. In this example, when the processor is to execute the instructions, the processor is to receive content from the second discovery node client and send the content to the first discovery node client.

Example 6 incorporates the subject matter of any combination of Examples 1-5. In this example, when the processor is to execute the instructions, the processor is to disconnect the first discovery node client or the second discovery node client after receiving a request to disconnect.

Example 7 incorporates the subject matter of any combination of Examples 1-6. In this example, when the processor is to execute the instructions, the processor is to delete the discovery node when no discovery node clients are connected to the discovery node.

Example 8 incorporates the subject matter of any combination of Examples 1-7. In this example, when the processor is to execute the instructions, the processor is to test for the existence of a discovery node using the node name before creating the discovery node. The first client may be given an option to connect to an existing discovery node using the node name.

Example 9 incorporates the subject matter of any combination of Examples 1-8. In this example, when the processor is to execute the instructions, the processor is to automatically push content that is published by the first discovery node client to the second discovery node client. The second discovery client may have subscribed to the discovery node and the first discovery node client is the owner of the discovery node.

Example 10 incorporates the subject matter of any combination of Examples 1-9. In this example, when the processor is to execute the instructions, the processor is to receive the node name from additional discovery node clients and create a dedicated network for a plurality of the discovery node clients.

Example 11 is a method for discovery of devices. The method includes connecting, via a processor, to a discovery node service. The method also includes sending, via the processor, a node name to the discovery node service. The method further includes sending, via the processor, data and content to be sent to a discovery node associated with the node name. The method further also includes receiving data and content from the discovery node, the data to include a list of devices subscribed to the discovery node.

Example 12 incorporates the subject matter of Example 11. In this example, the method includes connecting to a device from the list of subscribed devices through a direct network connection.

Example 13 incorporates the subject matter of any combination of Examples 11-12. In this example, the direct network connection is an encrypted network connection.

Example 14 incorporates the subject matter of any combination of Examples 11-13. In this example, the method includes subscribing to an additional discovery node by sending an additional node name to the discovery node service.

Example 15 incorporates the subject matter of any combination of Examples 11-14. In this example, the method includes receiving content published by devices from the list as it is published.

Example 16 incorporates the subject matter of any combination of Examples 11-15. In this example, the method includes disconnecting from a discovery node, the processor to no longer receive data from the discovery node service.

Example 17 incorporates the subject matter of any combination of Examples 11-16. In this example, the method includes sending credentials to access an access-controlled discovery node.

Example 18 incorporates the subject matter of any combination of Examples 11-17. In this example, the method includes sending a piece of content via a direct network connection to a device from the list of devices.

Example 19 incorporates the subject matter of any combination of Examples 11-18. In this example, the piece of content of content has a size greater than a threshold size.

Example 20 incorporates the subject matter of any combination of Examples 11-19. In this example, the method includes creating a dedicated connection with a plurality of devices from the list of devices.

Example 21 is a computer readable medium for device discovery. The computer readable medium has instructions stored therein that, in response to being executed on a computing device, cause the computing device to connect, via a processor, to a discovery node service. The computer readable medium also has instructions stored therein causing the computing device to send, via the processor, a node name to the discovery node service. The computer readable medium also has instructions stored therein causing the computing device to send, via the processor, data and content to be sent to a discovery node associated with the node name. The computer readable medium also has instructions stored therein causing the computing device to receive, via the processor, data and content from the discovery node. The computer readable medium also has instructions stored therein causing the computing device to connect, via the processor, to a discovery node client through a direct network connection.

Example 22 incorporates the subject matter of Example 21. In this example, the computer readable medium also has instructions stored therein causing the computing device to request creation of a discovery node.

Example 23 incorporates the subject matter of any combination of Examples 21-22. In this example, the computer readable medium also has instructions stored therein causing the computing device to connect to the discovery node client via an encrypted network connection.

Example 24 incorporates the subject matter of any combination of Examples 21-23. In this example, the computer readable medium also has instructions stored therein causing the computing device to disconnect from a discovery node.

Example 25 incorporates the subject matter of any combination of Examples 21-24. In this example, the computer readable medium also has instructions stored therein causing the computing device to send a request to delete previously sent data or content.

Example 26 incorporates the subject matter of any combination of Examples 21-25. In this example, the computer readable medium also has instructions stored therein causing the computing device to subscribe to an additional discovery node by sending an additional node name to the discovery node service.

Example 27 incorporates the subject matter of any combination of Examples 21-26. In this example, the computer readable medium also has instructions stored therein causing the computing device to send a piece of content via the direct network connection to the discovery node client.

Example 28 incorporates the subject matter of any combination of Examples 21-27. In this example, the computer readable medium also has instructions stored therein causing the computing device to send credentials to access an access-controlled discovery node.

Example 29 incorporates the subject matter of any combination of Examples 21-28. In this example, the computer readable medium also has instructions stored therein causing the computing device to subscribe or unsubscribe from the discovery node.

Example 30 incorporates the subject matter of any combination of Examples 21-29. In this example, the computer readable medium also has instructions stored therein causing the computing device to create a dedicated connection with a plurality of devices from the list of devices.

Example 31 is a system for discovery of devices. The system includes means for receiving a node name and data from a first discovery node client. The system also includes means for creating a discovery node using the node name. The system further includes means for receiving a connection request with the node name from a second client. The system further also includes means for sending the data to the second client.

Example 32 incorporates the subject matter of Example 31. In this example, the system includes means for connecting the second client to with the first client.

Example 33 incorporates the subject matter of any combination of Examples 31-32. In this example, the system includes means for limiting access to the discovery node.

Example 34 incorporates the subject matter of any combination of Examples 31-33. In this example, the system includes means for receiving content from the second client and sending the content to the first client.

Example 35 incorporates the subject matter of any combination of Examples 31-34. In this example, the system includes means for deleting the discovery node when no clients are connected to the discovery node.

Example 36 incorporates the subject matter of any combination of Examples 31-35. In this example, the system includes means for creating a dedicated connection with a plurality of clients from a list of clients connected to the discovery node.

Example 37 incorporates the subject matter of any combination of Examples 31-36. In this example, the system includes means for automatically pushing content that is published by the first discovery node client to the second discovery node client. The second discovery client may have subscribed to the discovery node and the first discovery node client may be the owner of the discovery node.

Example 38 incorporates the subject matter of any combination of Examples 31-37. In this example, the system includes means for configuring a discovery node.

Example 39 incorporates the subject matter of any combination of Examples 31-38. In this example, the system includes means for deleting previously published content.

Example 40 incorporates the subject matter of any combination of Examples 31-39. In this example, the system includes means for storing the data from the first discovery node client.

Example 41 is an apparatus for discovering devices. The apparatus is a mobile device that includes a processor, a display and a storage device. The storage device includes code to direct the processor to connect to a discovery node service. The storage device also includes code to direct the processor to send a node name to the discovery node service. The storage device also includes code to direct the processor to connect to a discovery node associated with the node name. The storage device also includes code to direct the processor to send data and content to be sent to the discovery node associated with the node name. The storage device also includes code to direct the processor to receive data and content from the discovery node, the data to include a list of devices subscribed to the discovery node.

Example 42 incorporates the subject matter of Example 41. In this example, the storage device includes code to direct the processor to subscribe to the discovery node associated with the node name.

Example 43 incorporates the subject matter of any combination of Examples 41-42. In this example, the storage device includes code to direct the processor to connect to a device from the list of subscribed devices through a direct network connection.

Example 44 incorporates the subject matter of any combination of Examples 41-43. In this example, the storage device includes code to direct the processor to request creation of a discovery node.

Example 45 incorporates the subject matter of any combination of Examples 41-44. In this example, the storage device includes code to direct the processor to connect to a device from the list of devices via an encrypted network connection.

Example 46 incorporates the subject matter of any combination of Examples 41-45. In this example, the storage device includes code to direct the processor to disconnect from a discovery node.

Example 47 incorporates the subject matter of any combination of Examples 41-46. In this example, the storage device includes code to direct the processor to send a request to delete previously sent data or content.

Example 48 incorporates the subject matter of any combination of Examples 41-47. In this example, the storage device includes code to direct the processor to subscribe to an additional discovery node by sending an additional node name to the discovery node service.

Example 49 incorporates the subject matter of any combination of Examples 41-48. In this example, the storage device includes code to direct the processor to send a piece of content via the direct network connection to a device from the list of devices.

Example 50 incorporates the subject matter of any combination of Examples 41-49. In this example, the storage device includes code to direct the processor to unsubscribe from one or more discovery nodes.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A system for discovering devices, comprising:
a memory that is to store instructions; and
a processor communicatively coupled to the memory, wherein when the processor is to execute the instructions, the processor is to:
receive, from a first discovery node client, a node name and data, the data comprising a security and access policy;
create a discovery node using the node name, the discovery node to be used to discover devices connected to the discovery node;
publish, via the discovery node, a list of media access control (MAC) addresses of devices that are allowed to subscribe to the discovery node with the node name based on the security and access policy;
receive a connection request with the node name from a second discovery node client with a media access control address from the list of MAC addresses; and
send the data to the second discovery node client.

2. The system of claim 1, the data comprising a device id, the device id to be used by the second discovery node client to connect with the first discovery node client.

3. The system of claim 1, the data comprising access control information to be used to limit access to the discovery node.

4. The system of claim 1, the data comprising discovery node configuration data, the discovery node configuration data to be used to configure the discovery node based on a context.

5. The system of claim 1, the processor to further receive content from the second discovery node client and send the content to the first discovery node client.

6. The system of claim 1, the processor to further disconnect the first discovery node client or the second discovery node client after receiving a request to disconnect.

7. The system of claim 1, the processor to further delete the discovery node when no discovery node clients are connected to the discovery node.

8. The method of claim 1, comprising a database, the database comprising data related to existing discovery nodes, content published to discovery nodes, and subscribers to each discovery node.

9. The method of claim 1, wherein the data comprises the node name and the security access policy for the discovery node using the node name.

10. A method for discovery of devices, comprising:
receiving, from a first discovery node client, a node name and data, the data comprising a security and access policy;
creating a discovery node using the node name;
publishing, via the discovery node, a list of media access control (MAC) addresses of devices that are allowed to subscribe to the discovery node with the node name based on the security and access policy;
receiving a connection request with the node name from a second client with a media access control address from the list of MAC addresses; and
sending the data to the second client.

11. The method of claim 10, further comprising connecting the second client to the first client.

12. The method of claim 10, further comprising limiting access to the discovery node.

13. The method of claim 10, further comprising receiving content from the second client and sending the content to the first client.

14. The method of claim 10, further comprising deleting the discovery node when no clients are connected to the discovery node.

* * * * *